United States Patent [19]

Pfefferle

[11] 4,439,136

[45] Mar. 27, 1984

[54] THERMAL SHOCK RESISTANT SPHERICAL PLATE STRUCTURES

[75] Inventor: William C. Pfefferle, Middletown, N.J.

[73] Assignee: The United States of America as represented by Administrator of Environmental Protection Agency, Washington, D.C.

[21] Appl. No.: 149,458

[22] Filed: May 13, 1980

[51] Int. Cl.³ .................. F23D 3/40; F23D 13/12
[52] U.S. Cl. .................................. 431/7; 431/268; 431/326; 431/328; 126/92 R; 126/91 A; 422/180; 422/177
[58] Field of Search ............ 431/268, DIG. 1, 328, 431/326, 2, 7, 147, 347, 348; 126/92 AC, 91 R, 91 A, 92 R; 122/4 D; 60/299, 301, 302, 723; 422/180, 177, 171

[56] References Cited

U.S. PATENT DOCUMENTS

| | | | |
|---|---|---|---|
| 2,247,035 | 6/1941 | Pravaz | 431/328 X |
| 2,921,176 | 1/1960 | Scofield | 431/268 X |
| 3,255,123 | 6/1966 | Haensel | 422/180 X |
| 3,922,136 | 11/1975 | Koch | 431/328 X |
| 3,943,705 | 3/1976 | De Corso et al. | 431/268 X |

FOREIGN PATENT DOCUMENTS

| | | | |
|---|---|---|---|
| 692662 | 8/1964 | Canada | 431/328 |
| 2403973 | 8/1974 | Fed. Rep. of Germany | 422/180 |
| 1056454 | 4/1952 | France | 431/328 |

Primary Examiner—Samuel Scott
Assistant Examiner—Randall L. Green

[57] ABSTRACT

Thermal shock resistant catalytic monolithic structures are described comprising curved-surface plates with flow-through passages. Such structures are especially useful as combustor catalysts and their use in catalytic combustors permits much more rapid start-up and cool down than with conventional monolithic catalysts.

9 Claims, 2 Drawing Figures

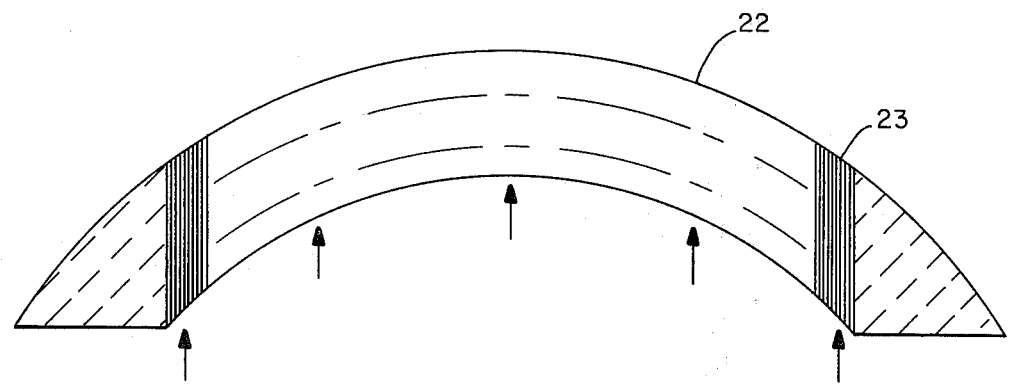
FIG.—1
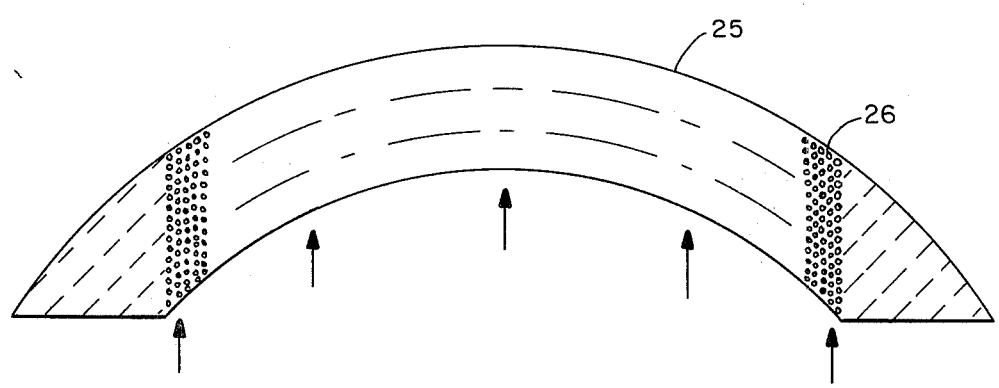
FIG.—2

THERMAL SHOCK RESISTANT SPHERICAL PLATE STRUCTURES

The invention described herein was made in the course of, or under a contract, with the Environmental Protection Agency.

The present invention relates to the design of practical combustors utilizing ceramic catalysts. A serious limitation on the use of monolithic catalysts in catalytic combustors is that ceramic materials tend to fail when subjected to large variations in operating temperatures. This severely restricts the use of such catalysts in many combustor applications since rapid cycling of the combustion temperature is often required in combustors such as those for gas turbines. Present catalytic combustor designs typically require ceramics which possess a greater thermal shock resistance than is available from high temperature ceramics.

It is an object of this invention to provide a method and apparatus for combustion of fuels over a catalyst which allows cycling of the combustion temperature at rates equivalent to those experienced by conventional thermal combustors.

It is further an object of this invention to provide a catalytic reactor which is not damaged by rapid heating or cooling.

Another object is to provide catalyst structures and methods of use which obviate thermal shock problems.

The invention in summary includes a method and catalyst structure in which the catalyst is a monolithic structure in the form of a domed plate with flow-through passages.

FIG. 1 is a cross-sectional view of a spherical plate catalytic monolith with axial flow-through passages in accordance with one embodiment of the present invention.

FIG. 2 is a cross-sectional view of a spherical plate catalytic monolith with ceramic sphere flow passages in accordance with another embodiment of the invention.

As will be explained, catalytic structures according to the present invention are inherently resistant to thermal shock because the free movements permitted tend to relieve thermally generated stresses. It is believed, for example, that the shaped spherical plate design behaves much like a bimetallic strip of similar shape. Catalytic combustors usoing catalyst structures of the presnt invention are surprisingly resistant to thermal shock.

Referring to the drawing, FIG. 1 shows a domed structure 22 with axial flow passages 23 with the passages oriented perpendicular to a plane tangent to the domed plate. This design offers simple combustor construction along with improved thermal shock resistance as compared to flat plate or axial flow cylindrical monoliths of conventional design.

FIG. 2 shows a domed structure 25 in the form of ceramic sponge with flow passages 26. The ceramic sponge is formed by foam ceramic processes which create the flow passages with a preferred orientation, e.g. perpendicular to a plane tangent to the dome plate.

This invention may be employed in catalytic combustors operating under conditions as specified in U.S. Pat. No. 3,928,961.

EXAMPLES

According to the present invention, the catalytic structure 22 of FIG. 1 is formed from a catalytic ceramic material formed into curved sheets with axially extending flow-through passages having cell walls no thicker than about 0.002 inches (20 mils). The catalytic structure 25 of FIG. 2 is formed by foam ceramics technology, for example as described in U.S. Pat. No. 4,076,888, which is especially advantageous in making the curved shapes of the present invention.

The unique combination of thin flow passage walls and stress-relieving curved shapes described in the present invention result in catalyst structures which, unlike conventional catalytic monoliths, are extremely resistant to thermal shock damage. The catalyst of the structure can be a ceramic oxide of the spinel type, or a high melting catalytically active ceramic. Ceramics with a high coefficient of thermal expansion, such as a nickel doped stabilized zirconia, may be used. Accordingly, a ceramic may be selected primarily on the basis of its high temperature and catalytic properties. Magnesium chrome spinels and lanthanum chrome spinels are particularly useful catalytic ceramics in both embodiments.

The invention has been described in detail with reference to specific preferred embodiments thereof, but it will be understood that variations and modifications can be effected within the spirit and scope of the invention.

What is claimed is:

1. A method of combusting fuels with a catalyst structure which obviates the effects of thermal shock, including the steps of providing a monolithic structure which is comprised of a catalytic ceramic material, said structure being formed in the shape of a domed plate comprised of a plurality of open-ended cells having integral walls with the cell walls defining parallel flow-through passages, directing a mixture of fuel and air across the plate and through the passages, catalytically combusting the mixture passing through the passages, and causing the domed shape of the plate to flex concave and convex under thermal expansion and contraction for minimizing thermally-generated stresses within the structure.

2. The method of claim 1 in which the passages are perpendicular to a plane tangent to the domed plate.

3. The method of claim 1 in which said catalyst is a catalytically active ceramic oxide of the spinel type.

4. The method of claim 1 in which said catalyst is a high melting catalytically active ceramic.

5. A catalytically active monolithic structure for combusting fuels whereby the effects of thermal shock are obviated, said structure being formed of a catalytic ceramic in the shape of a domed plate comprised of a plurality of open-ended cells having integral walls with the cell walls defining parallel flow-through passages with the domed shape of the plate flexing concave and convex under thermal expansion and contraction during catalytic combustion of a mixture of fuel and air passed across the plate for minimizing thermally-generated stresses within the structure.

6. The structure of claim 5 in which said catalyst is a catalytically active ceramic oxide of the spinel type.

7. A combustor for burning fuels comprising a monolithic structure formed of a catalytic ceramic in the shape of a domed plate, means forming a plurality of open-ended cells having integral walls with the cell walls defining parallel flow-through passages extending through the plate with the domed shape of the plate flexing concaven and convex under thermal expansion and contraction during catalytic combustion of a mixture of fuel and air passed across the plate for minimizing thermal-generated stresses within the structure.

8. The combustor of claim 7 in which the passages are perpendicular to a plane tangent to the domed plate.

9. The combustor of claim 7 in which the structure comprises a foamed ceramic which forms the flow passages.

* * * * *